United States Patent [19]

Griffin

[11] Patent Number: 5,279,152
[45] Date of Patent: Jan. 18, 1994

[54] APPARATUS FOR TESTING AND BLEEDING AUTOMATIC BRAKING SYSTEMS

[75] Inventor: Cortland L. Griffin, Santa Ana, Calif.

[73] Assignee: McDonnell Douglas Corporation, Long Beach, Calif.

[21] Appl. No.: 734,760

[22] Filed: Jul. 23, 1991

[51] Int. Cl.⁵ .................................. G01L 5/28
[52] U.S. Cl. ..................................... 73/121
[58] Field of Search .............. 73/118.1, 121, 128, 73/119A, 121; 303/92; 364/426.01, 426.02

[56] References Cited

U.S. PATENT DOCUMENTS

| | | | |
|---|---|---|---|
| 3,852,613 | 12/1974 | Wienecke | 303/92 |
| 4,085,979 | 4/1978 | Leiber et al. | 73/121 |
| 4,192,180 | 3/1980 | Gerstenmeier et al. | 73/121 |
| 4,246,566 | 1/1981 | Endo et al. | 73/119 A |
| 4,340,935 | 7/1982 | Anlauf et al. | 73/121 |
| 4,567,756 | 2/1986 | Colborn | 73/118.1 |
| 4,699,001 | 10/1987 | Blum et al. | 73/121 |
| 4,756,186 | 7/1988 | Sangawa | 73/119 A |
| 5,003,818 | 4/1991 | Hoodenpyle et al. | 73/121 |
| 5,074,626 | 12/1991 | Kramer et al. | 73/121 |

Primary Examiner—Robert Raevis
Attorney, Agent, or Firm—John P. Scholl

[57] ABSTRACT

A testing and bleeding apparatus incorporates an adapter rack, an adapter cable and a bleed cable harness for connecting the main unit of the apparatus to an automatic braking system. An adapter rack hold down assembly is used to secure the apparatus in order to allow in flight testing of the ABS. The apparatus incorporates bypass switch panels, a test switch and indicator light panels to test the circuitry and components of the ABS. The apparatus also incorporates a voltmeter, a meter select switch to tap into selected ABS circuits, a test lead and sets of test jacks to test each individual ABS wire as well as other selected components of the ABS.

25 Claims, 10 Drawing Sheets

APPARATUS FOR TESTING AND BLEEDING AUTOMATIC BRAKING SYSTEMS

BACKGROUND OF THE INVENTION

The invention relates generally to automatic braking system testers and brake bleeding devices and, more particularly, to a tester and brake bleeder of automatic braking systems which utilize a computer system and which are incorporated in airliners, such as the McDonnell Douglas MD 80, DC 9 and DC 10.

Many modern airliners utilize an automatic braking system (ABS) to automatically apply full braking power with ground spoiler deployment during a rejected take-off and to automatically apply a preselected level of braking power with ground spoiler deployment during landing. For landing, the pilot may select one of three ABS land modes providing either minimum, medium or maximum braking force. For takeoff, the pilot may select the ABS take off mode which provides maximum braking force during rejected takeoff. Incorporation of the ABS obviates the likelihood that brake application is delayed or not fully applied in these situations. In addition, the ABS ensures that full, steady braking pressure is applied and that it is applied at the earliest time for optimum anti skid braking efficiency.

A testing system currently in use on the ABS for the above identified airliners is integrated in the computer used in the ABS and is known as (or identified as) the Built In Testing Equipment (BITE). However, the BITE system has a number of disadvantages which render its use less than satisfactory and require technicians to utilize additional testing procedures and equipment when troubleshooting the ABS. Specifically, the BITE is not a comprehensive testing system, and, therefore, it can produce misleading results. In addition, the BITE system is not capable of fully testing some components and some component circuits of the ABS. In this regard, the BITE cannot test components and circuits used in certain ABS modes (minimum/land, maximum/land and take-off), cannot test anti-skid wheel velocity transducers and cannot isolate ABS computer control unit (LRU) component malfunctions from wiring harness and position switch malfunctions. Consequently, technicians troubleshooting the ABS often must perform aircraft taxi runs or test flights. The instructions for using the BITE system are very complex and difficult to comprehend rendering the BITE system subject to improper use or misinterpretation of the results. In addition, in order to bleed the brake manifolds, the technician must use a separate bleeder device.

An ABS tester is thus needed that is capable of fully testing the ABS in all its operational modes. An ABS tester is also needed that is simple and easy to use and that is capable of differentiating between wiring, switch and other component system malfunctions. An ABS tester is also needed that is capable of being used to bleed the brake manifolds.

SUMMARY OF THE INVENTION

It is a principal object of the present invention to provide an improved ABS tester capable of testing all the circuits and circuit components used in all the operational modes of the ABS.

It is another object of the present invention to provide an improved ABS tester capable of isolating LRU component malfunctions from wiring harness and position switch malfunctions.

It is also another object of the present invention to provide an improved ABS tester which is simple and easy to use.

It is also an object of the present invention to provide an improved ABS tester which is capable of being used to bleed the brake manifold.

It is also an object of the present invention to provide an improved ABS tester which is capable of being used during in flight testing of the ABS.

The tester of the present invention utilizes an adapter rack and adapter cable so that the tester main unit can be tapped into the circuits of the ABS computer control panel, computer control unit, valid control switches, anti skid control unit and brake hydraulic system. This allows the tester of the present invention to test all ABS components while they are in functional use, and allows the tester to test the ABS function and components in each and every operational mode.

The tester incorporates bypass and test switch panels for electrical interconnection of the anti skid control unit, the ABS computer control unit, the ABS computer control panel, the valid control switches and the brake hydraulic system to the ABS power supply. The bypass switches can aid in fault isolating a malfunctioning component supplying the correct input for the component and verifying the subsequent correct operation of the system. The tester also incorporates indicator light panels which are connected to the anti skid unit, the computer control unit and panel, the valid switches and the hydraulic system and which may, for some test modes, be connected to the bypass switch panels. These switch and indicator panels allow for selective individual testing of each of the circuits.

The tester also utilizes a bleed harness so that the tester may be connected to the left and right brake manifolds for bleeding of the manifolds. For bleeding of the manifolds, the adapter cable must be disconnected from the tester main unit and the bleed harness connected thereto. In addition, for bleeding of the manifolds, the tester is connected to a power supply means. Essentially, the tester holds the valves of the manifolds open so that the hydraulic fluid can be pumped into the manifolds and air purged therefrom.

DETAILED DESCRIPTION OF THE PREFERRED EMBODIMENT

Figure 1A:
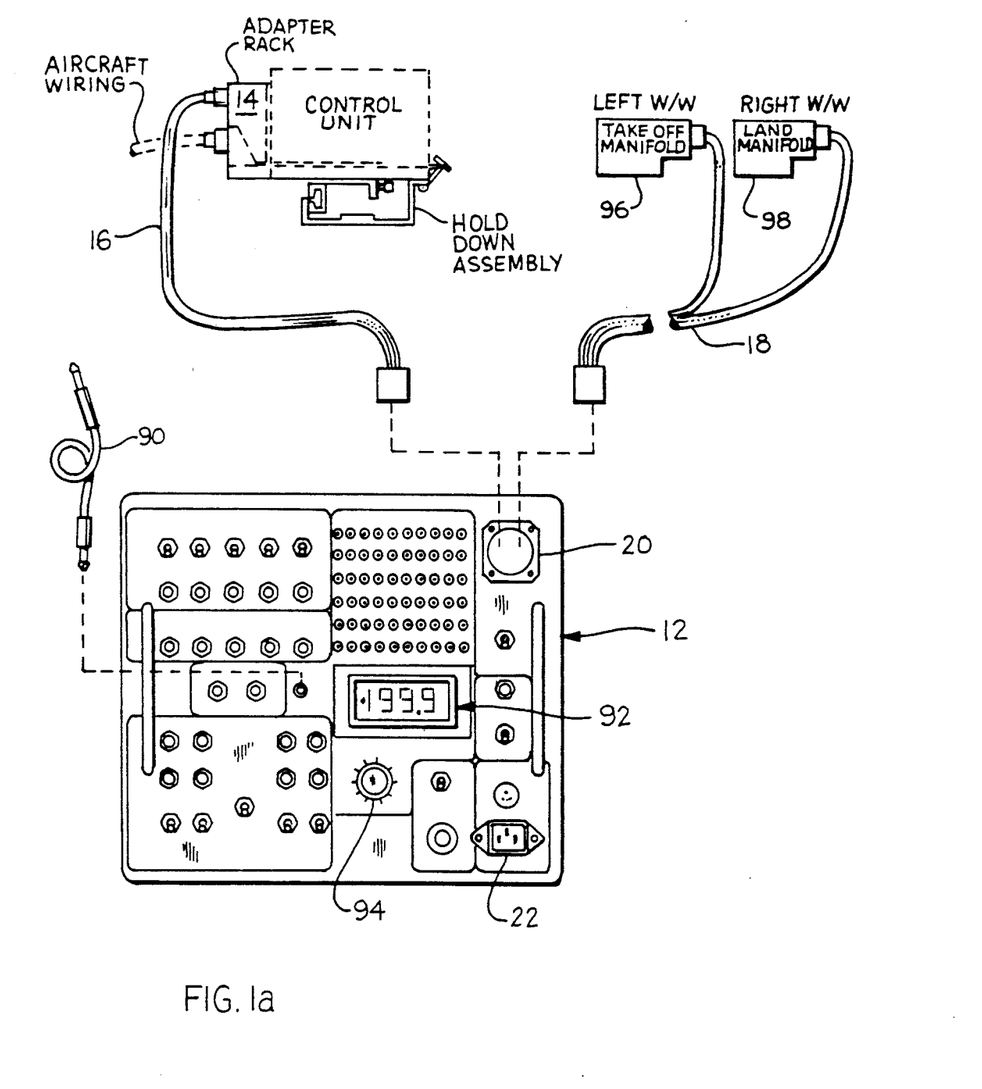
FIG. 1a is a diagrammatic representation of the tester of the present invention showing the tester main unit as well as the adapter rack, adapter hold down, adapter cable and bleed harness.

Referring to FIG. 1 of the drawings, the ABS brake bleeder and system tester apparatus of the present invention is generally designated by the numeral 10. The apparatus 10 preferably includes a main tester unit 12, an adapter rack 14, an adapter hold down assembly 15, an adapter cable 16 and a bleed harness 18, as shown in FIG. 1a. The tester main unit 12 is provided with an input jack 20 for receiving cable 16 and harness 18. Cable 16 and harness 18 are interchangeably connectable to input jack 20. Cable 16 allows the tester unit 12 to be electrically connected to the ABS for testing thereof.

Figure 1B:
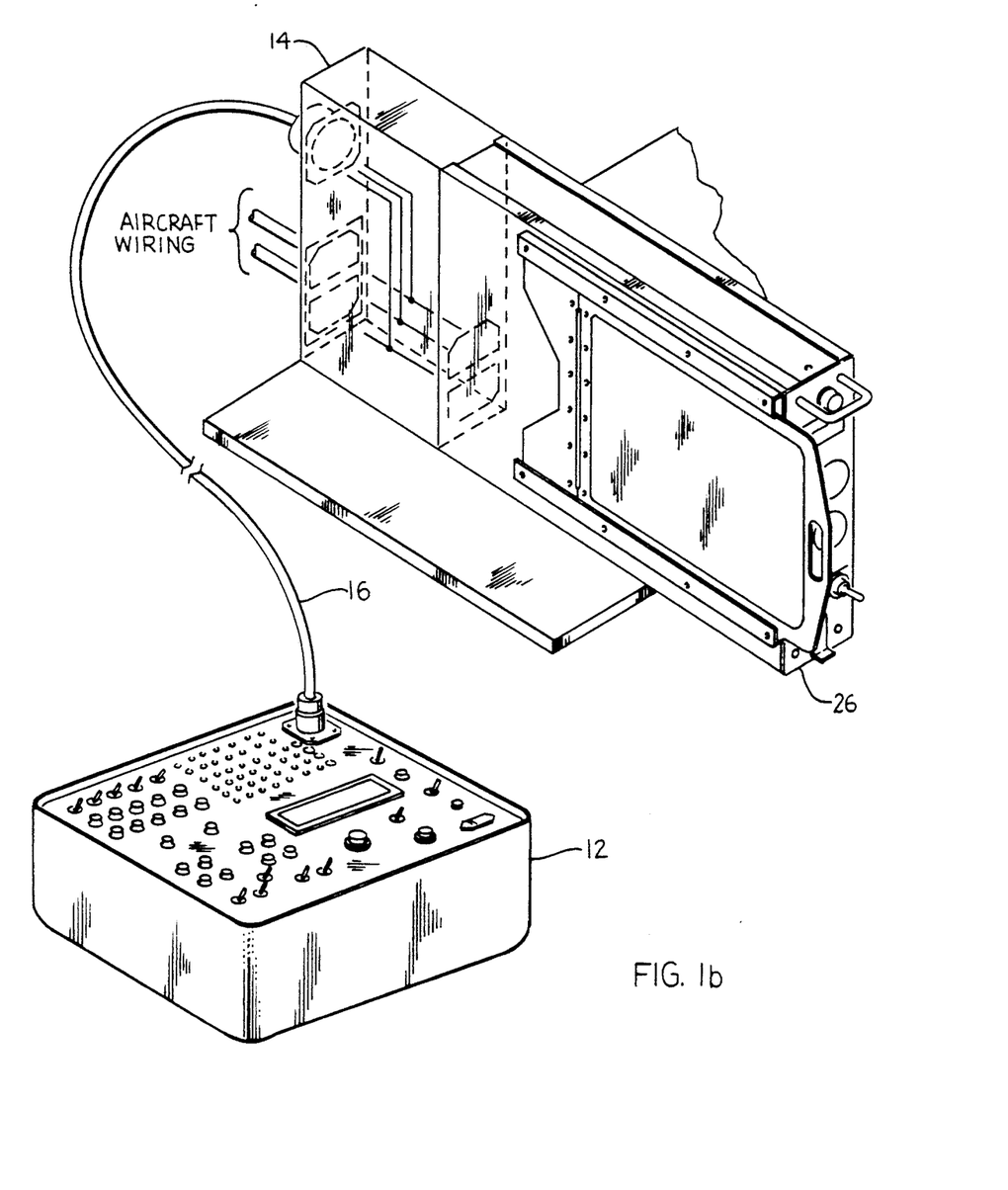
FIG. 1b is a diagrammatic representation of components of the tester of the present invention showing the adapter rack of FIG. 1a in detail and also showing the tester main unit as well as the adapter cable of FIGURE 1a and the ABS control unit.
Figure 2:
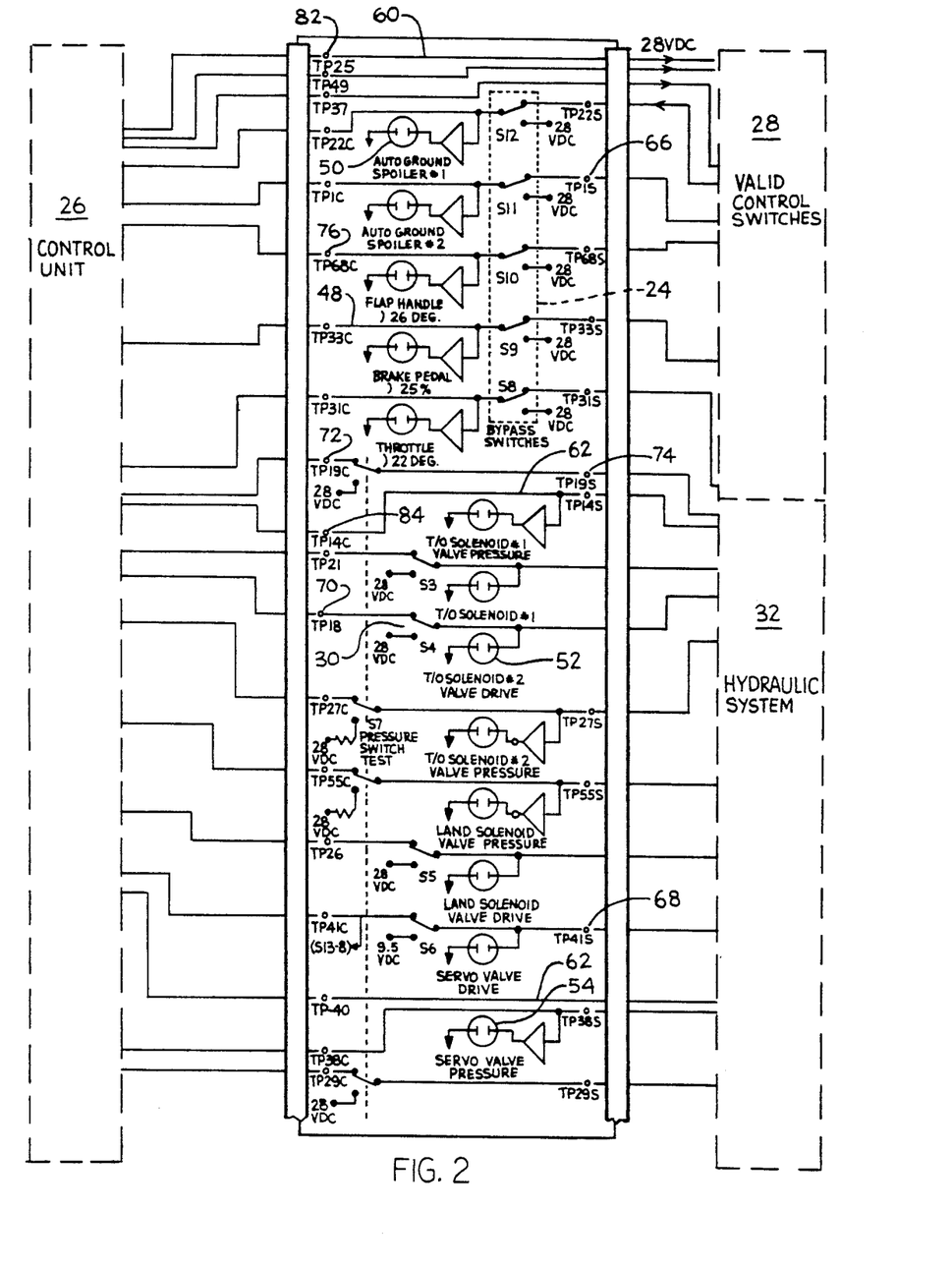
FIG. 2 is a circuit block diagram of the tester of the present invention showing its electrical connections to the ABS computer control unit, the ABS valid control switches and the ABS hydraulic system.
Figure 3:
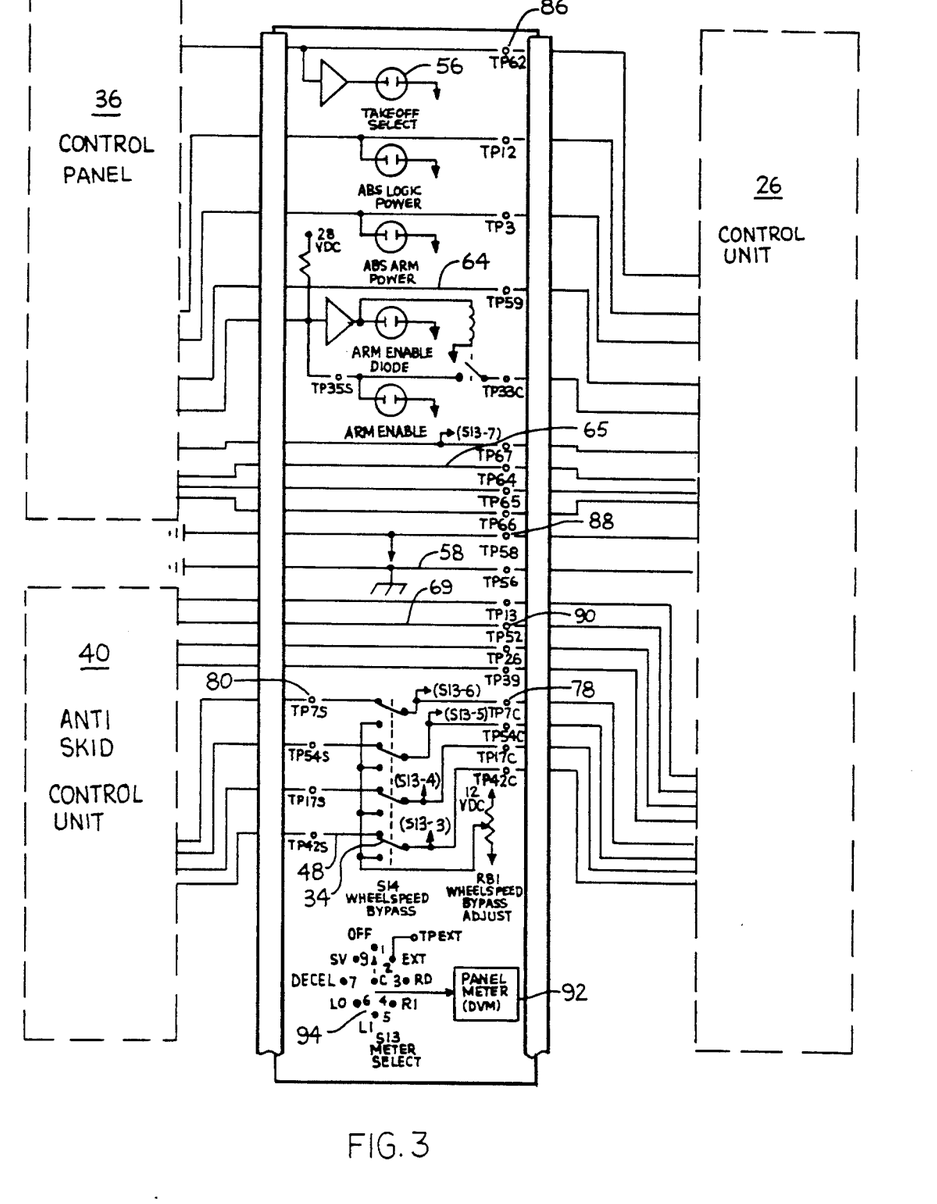
FIG. 3 is a circuit block diagram of the tester of the present invention showing its electrical connections to the ABS computer control panel, the anti skid control unit and the ABS computer control unit.

FIGS. 2 and 3 show a first operational mode of the tester 10. In the first operational mode, the tester main unit 12 is connected to the ABS in parallel with the ABS computer control unit 26 (FIG. 1b). The first operational mode tests the ABS computer control unit 26 and computer control panel 36 as well as the valid control switches 28, electronic components of the brake hydraulic system 32 and anti skid control unit 40 (specifically, the anti skid valid and velocity inputs).

Figure 1C:
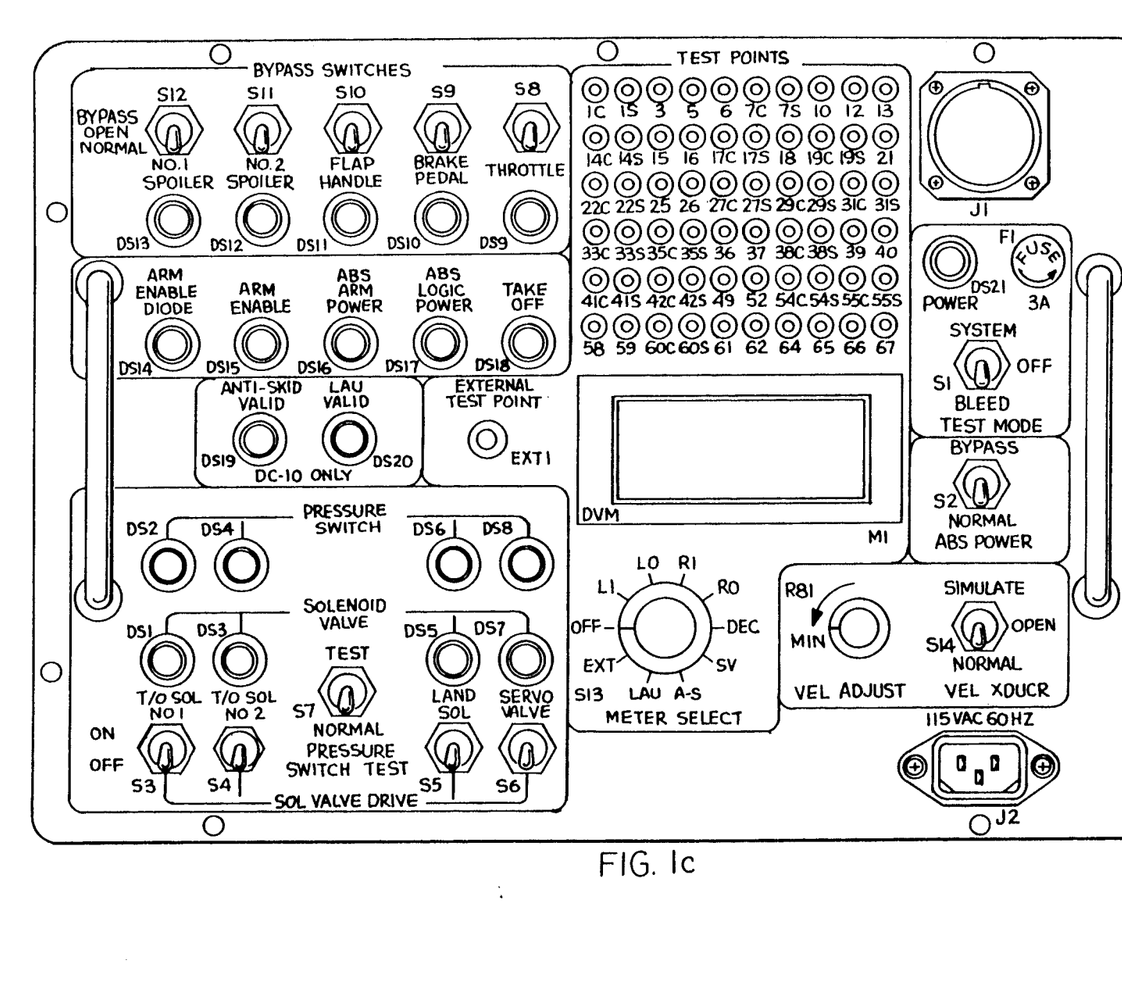
FIG. 1c is a diagrammatic representation of the tester main unit of FIG. 1a showing the face of the tester main unit in detail.

In the first operational mode, the circuit components of the tester main unit 12 are preferably electrically connected to the electrical power input circuits of the ABS. The tester unit 12 also preferably includes a first bypass switch panel 24 which comprises switches S8, S9, S10, S11, and S12, as shown in FIGS. 1c and 2. The bypass panel 24 is electrically connected to the computer control unit 26 of the ABS, the valid control switches 28 of the ABE: and the electrical power tapping means 38, as shown in FIG. 2. Interconnecting wires 48 preferably interconnect the bypass panel 24 to the ABS control unit 26 and valid switches 28. The tester unit 12 also includes a second bypass switch panel 30 which comprises switches S3, S4, S5 and S6, as shown in FIGS. 1c and 2. The bypass panel 30 is electrically connected to the computer control unit 26, electrical components of the ABS hydraulic system 32 and the electrical power tapping means 38, as shown in FIG. 2. Interconnecting wires 48 preferably interconnect the bypass panel 30 to the control unit 26 and the hydraulic system 32. The tester unit 12 also includes a third bypass switch panel 34 which comprises switches S14, as shown in FIGS. 1c and 3. The bypass panel 34 is electrically connected to the anti skid control unit 40 of the ABS, to a computer control unit 26 of the ABS and to power tapping means 38, as shown in FIG. 3. Interconnecting wires 48 preferably interconnect the bypass panel 34 to the anti skid unit 40 and the control unit 26. The third panel 34 is also electrically connected to a wheelspeed adjustment control 42 which adjusts simulated voltage output from a selected wheel transducer in order to test associated circuits and the anti skid control unit. The third panel 34 Is also electrically connected to a meter select switch S13 which Is electrically connected to a voltmeter 92 for testing of the anti skid wheel transducers and the anti Skid control unit velocity, static and spin up output. The bypass switches of bypass panels 24, 30 and 34 aid in fault isolating a malfunctioning component by supplying the correct input for this component and verifying the subsequent correct operation of the ABS.

The tester main unit 12 also includes, for the first operational mode, a first indicator light panel 50, a second indicator light panel 52 and a fourth indicator light panel 54, as shown in FIGS. 1c and 2. The first indicator light panel 44 preferably includes indicators DS9, DS10, DS11, DS12 and DS13. The first indicator panel 50 is preferably electrically connected to the first bypass panel 24 and preferably is more specifically electrically connected to the interconnecting wires 48 which interconnect the bypass panel 24 to the control unit 26 and valid switches 28 in order to tap into and thereby test the electrical circuits thereof. The second Indicator light panel 52 preferably includes indicators DS1, DS3, DS5 and DS7. The second indicator panel 52 is preferably electrically connected to the second bypass panel 30 and preferably is more specifically electrically connected to the interconnecting wires 48 which interconnect the bypass panel 30 to the control unit 26 and the hydraulic system 32 in order to tap into and thereby test the electrical circuits thereof. The fourth indicator light panel 54 preferably includes indicators DS2, DS4, DS6 and DS8. The fourth indicator panel 54 is preferably electrically connected to the pressure test switch S7 and preferably is more specifically electrically connected to the interconnecting wires 48 which interconnect the test switch S7 to the control unit 26 and the hydraulic system 32 In order to tap into and thereby test the electrical circuits thereof.

The tester main unit 12 additionally includes, for the first operational mode, a third indicator light panel 56 shown in FIGS. 1c and 3. The third indicator panel 56 preferably includes indicators DS14, DS15, DS16, DS17 and DS18. The third indicator panel 56 preferably is electrically connected to the computer control panel 36 and the computer control unit 26 and is preferably more specifically electrically connected to a third set of interfacing wires 64 (FIG. 3) which interconnect the computer panel 36 and the control unit 26 in order to tap into and thereby test the electrical circuits thereof.

A first set of amplifiers 42 is preferably provided and electrically connected to the first indicator light panel 50 in order to provide sufficient electrical current to the first panel 50 for illumination thereof. Similarly, a third and fourth set of amplifiers 44 and 46 are preferably provided which are electrically connected to the third indicator panel 56 and the fourth indicator panel 54, respectively, in order to provide sufficient electrical current to the panels 56 and 54 for illumination thereof.

The tester main unit 12 includes, for the first operational mode a first, second, third, fourth, fifth, sixth, seventh, eighth, ninth, tenth, eleventh, twelfth and thirteenth set of test jacks (or test points) 66, 68, 70, 72, 74, 76, 78, 80, 82, 84, 86, 88 and 90, as shown in FIGS. 2 and 3. The first set of Jacks comprise TP1S, TP22S, TP60S, TP33S and TP31S. The second set of jacks comprise TP41S. The third set of jacks comprise TP21, TP10, TP36 and TP41C. The fourth set of jacks comprise TP19C, TP27C, TP55C and TP29C. The fifth set of test Jacks comprise TP19S, TPTP27S, TP55S and TP29S. The sixth set of jacks comprise TP22C, TPLC, TP60C, TP33C and TP31C. The seventh set of jacks comprise TP7C, TP54C, TP17C and TP42C. The eighth set of jacks comprise TP7S, TP54S, TP17S and TP42S. The ninth set of jacks comprise TP25, TP49 and TP37. The tenth set of jacks comprise TP14C, TP14S, TP40, TP38C and TP38S. The eleventh set of jacks comprise TP62, TP12, TP3, TP59, TP35C, TP35S TP67, TP64 and TP65. The twelfth set of jacks comprise TP58 and TP56. The thirteenth set of Jacks comprise TP13, TP52, TP26 and TP39.

The first set of test Jacks 66 is electrically connected to the first bypass switch panel 24 for tapping into the electrical circuits of the bypass panel 24 and the valid switches 28. The second set of jacks 68 is electrically connected to the second bypass switch panel 30 for tapping into the electrical circuits of the bypass panel 30 and the hydraulic system 32. The third set of test jacks 70 is connected to the second bypass panel 30 for tapping into the electrical circuits of the bypass panel 30 and the control unit 26. The fourth set of jacks 72 are connected to the test switch S7 for tapping into the circuits of the test switch S7 and the control unit 26. The fifth set of jacks 74 is connected to the test switch S7 for tapping into circuits of the test switch S7 and the hydraulic system 32. The sixth set of jacks 76 is connected to the first bypass panel 24 for tapping Into the circuits of the bypass panel 24 and the control unit 26. The seventh set of jacks 78 is connected to the third bypass panel 34 for tapping into the circuits of the bypass panel 34 and the control unit 26. The eighth set of jacks 80 is also connected to the third bypass panel for tapping into the circuits of the third panel 34 and the anti skid control unit 40. The remaining sets of jacks will be described in detail below. The test jacks function in conjunction with test lead 90 which may be plugged into external test point EXT1 (FIG. 1c) and thereby connected to the voltmeter 92 and meter select switch S13 in order to allow electrical connection of the test lead 90 into any one of the test jacks for testing of the electrical circuits of the ABS. This allows testing of any DC circuit in the ABS preferably in the range of 0 to 200 volts.

The tester main unit 12 includes, for the first operational mode, a first, second, third, fourth and fifth set of interfacing wires 60, 62 64, 65 and 58. The first set of interfacing wires 60 interconnect the control unit 26 and the valid switches 28. The second set of interfacing wires 62 interconnect the control unit 26 and the hydraulic system 32, as shown in FIG. 2. The third set of interfacing wires 64 interconnects the control unit 26 and the control panel 36, as shown in FIG. 3. The fourth set of interfacing wires 65 also interconnect the control panel 36 and the control unit 26, as shown in FIG. 3. The fifth set of interfacing wires 58 interconnect the control unit 26 and a ground. The sixth set of interfacing wires 69 interconnect the anti skid unit 40 and the control unit 26. The fourth set of interfacing wires are also electrically connected to the meter select switch S13 in order to selectively test circuits of the control panel 36 and the control unit 26. The ninth set of test jacks 82 is electrically connected to the first set of interfacing wires 60 for tapping into circuits of the control unit 26 and the valid control switches 28. The tenth set of jacks 84 is connected to the second set of interfacing wires 62 for tapping into circuits of the control unit 26 and the hydraulic system 32. The eleventh set of jacks 86 is connected to the third and fourth sets of interfacing wires 64 and 65 for tapping Into circuits of the control panel 36 and the control unit 26. The twelfth set of jacks 88 is connected to the fifth set of interfacing wires 58 for tapping into circuits of the control unit 26 and a ground. The thirteenth set of jacks 90 is connected to the sixth set of interfacing wires 69 for tapping into circuits of the control unit 26 and the anti skid unit 40. The test jacks allows access to each ABS wire for detailed troubleshooting of all components of the ABS.

In the specific instance where indicator lights DS17 and DS18 In the first operational test mode indicate there may be a diode failure of the diode between pins M and N of the control panel 36, test jacks TP62 and TP12 (which allow tapping into both sides of the diode) can be used to test the diode. A pair of test leads plugged into a suitable volt-ohm meter (not shown) and inserted into jacks TP62 and TP12 allow AC voltage testing across the diode or resistance testing of the diode for a determination of whether the diode Is open or shorted. The diode between pins G and V of the control panel 36 may also be tested for failure simply by using the third indicator light panel 56 and the voltmeter 92.

Figure 4:
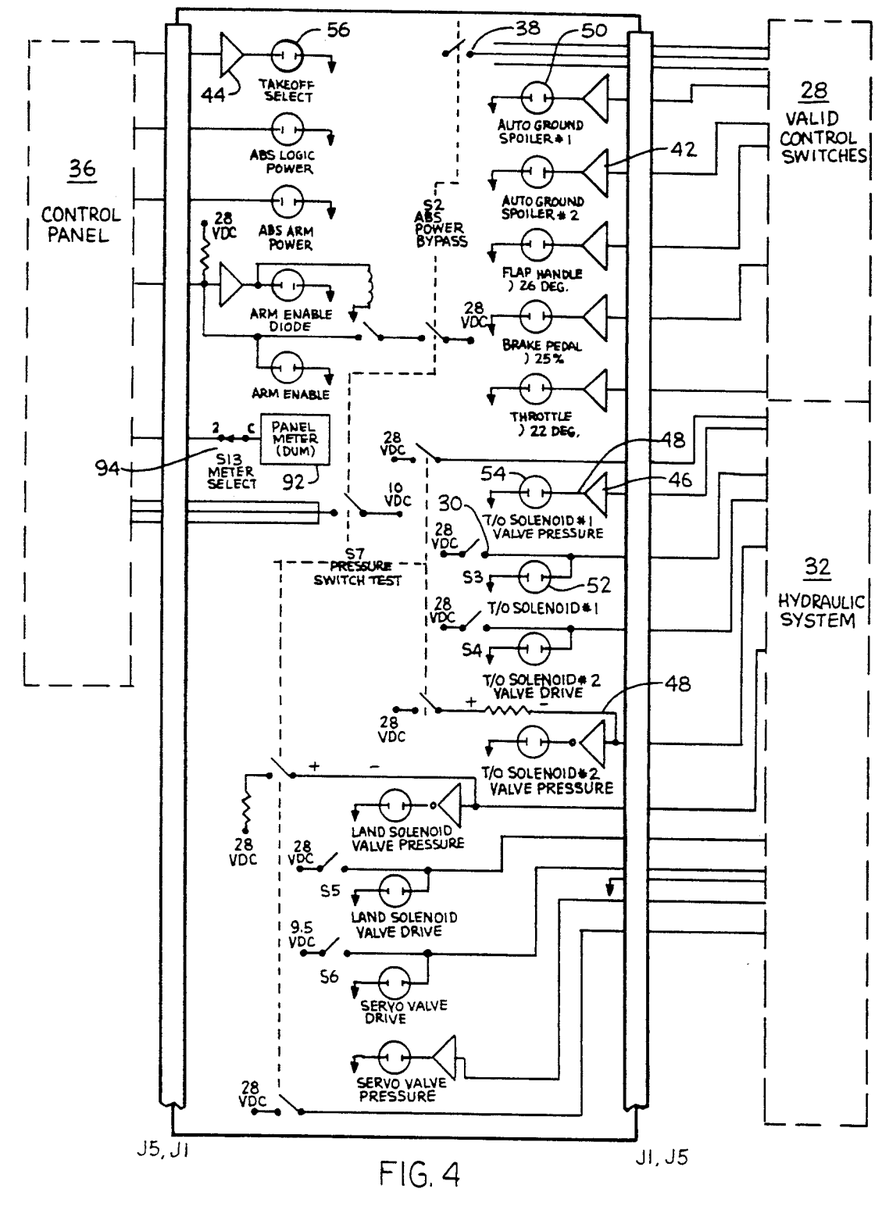
FIG. 4 is a circuit block diagram of the tester of the present invention showing its electrical connections to the ABS computer control panel, the ABS valid control switches and the ABS hydraulic system.

FIG. 4 shows a second operational mode of the invention 10. In the second operational mode, the circuit components of the tester main unit 12 are preferably connected to the electrical power input circuits of the ABS. In the second mode the computer control unit 26 is removed from the aircraft ABS and the tester main unit 12 is connected to the ABS in place of the control unit 26. Cable 16 and adapter rack 14 are preferably used to connect the main unit 12 to the ABS, identically as shown in FIG. 1b except that the control unit 26 is omitted. The tester main unit 12 is electrically connected to the ABS power input circuits (not shown). The tester 10 furnishes power to all aircraft signal and control switches that provide inputs to the ABS and to the ABS manifolds and is used to verify their correct operation. Switch operation verification is accomplished by placing the aircraft levers and switches in predetermined positions and verifying switch contact opening and closure by observing the respective indicators on the tester main unit 12. Manifold operation verification is accomplished by sequencing the solenoid valves in a predetermined order while observing the pressure switch indicators. Fault isolation down to the malfunctioning valve or pressure switch can then be accomplished.

For the second operational mode, the tester 10 includes test switch S7. Switch S7 is used to isolate pressure switch from valve faults. In contrast to the first operational mode, test switch S7 is electrically connected only to the hydraulic system 32 and the ABS power input circuits, as shown in FIG. 4. Similarly, second bypass switch panel 30 is connected only to the hydraulic system 32 and the power input circuits. A fourth bypass switch panel 38 is electrically connected to the valid control switches 28, the control panel 36 and the power input circuits. The fourth bypass panel 38 is electrically connected to two indicators of the third indicator panel 56. The two indicators are provided for connection to an arm enable circuit of the computer control panel 36. The first indicator light panel 50 Is electrically connected to the valid control switches 28 for testing the circuits thereof. The second indicator panel is electrically connected to the hydraulic system 32 and the second bypass switch panel 30 and preferably is more specifically connected to interconnecting wires 48 for tapping into circuits of the panel 30 and hydraulic system 32 for testing circuits thereof. The third indicator light panel 56 is electrically connected to the computer panel 36 for testing circuits thereof. The fourth indicator light panel 54 is electrically connected to the hydraulic system 32 for testing circuits thereof. The test unit 12 also includes a voltmeter 92 and a meter select switch 94, as in the first operational mode. The voltmeter 92 is connected to the select switch S13 which is connected to the computer control panel 36 for selective testing of the circuits of the control panel 36.

Figure 5:
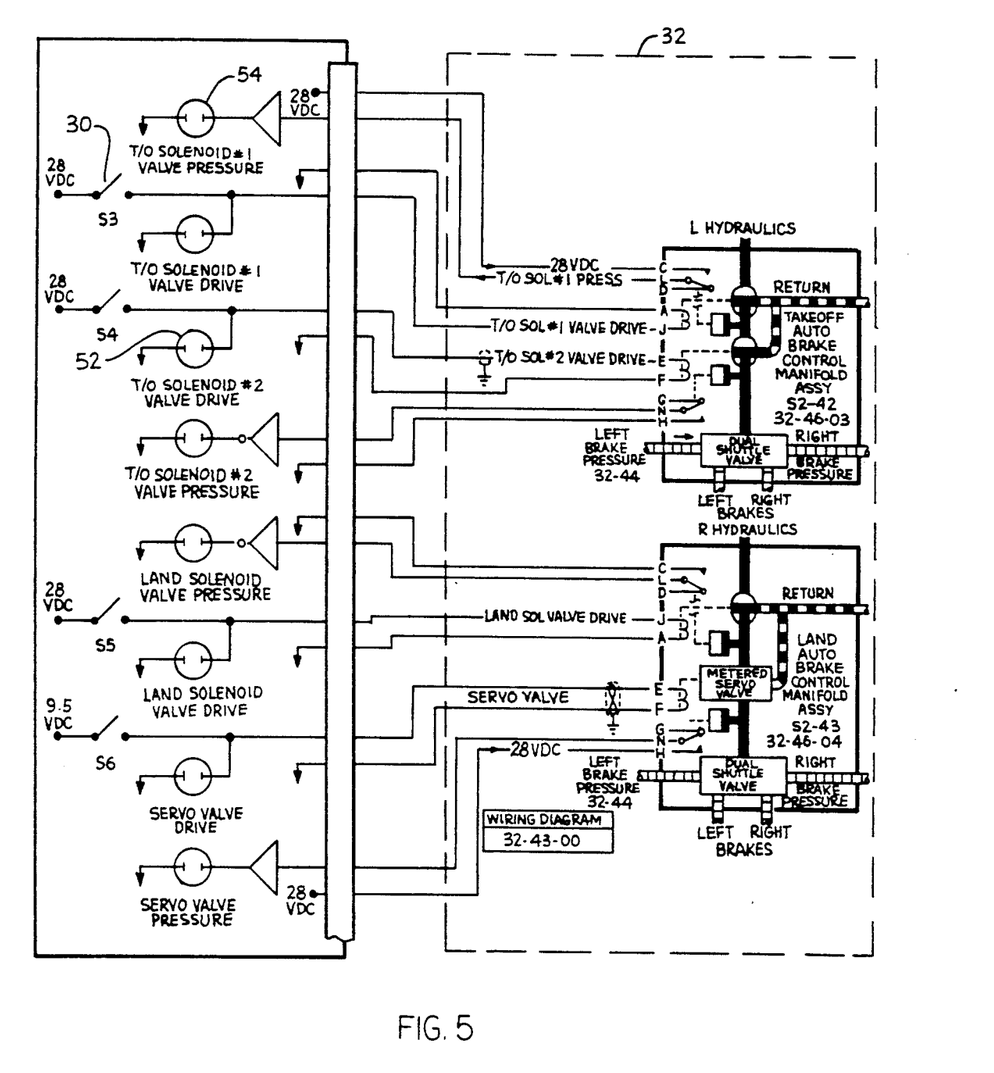
FIG. 5 is a circuit block diagram of the tester of the present invention showing its electrical connections to the ABS hydraulic system for bleeding of the brake manifolds.
Figure 6:
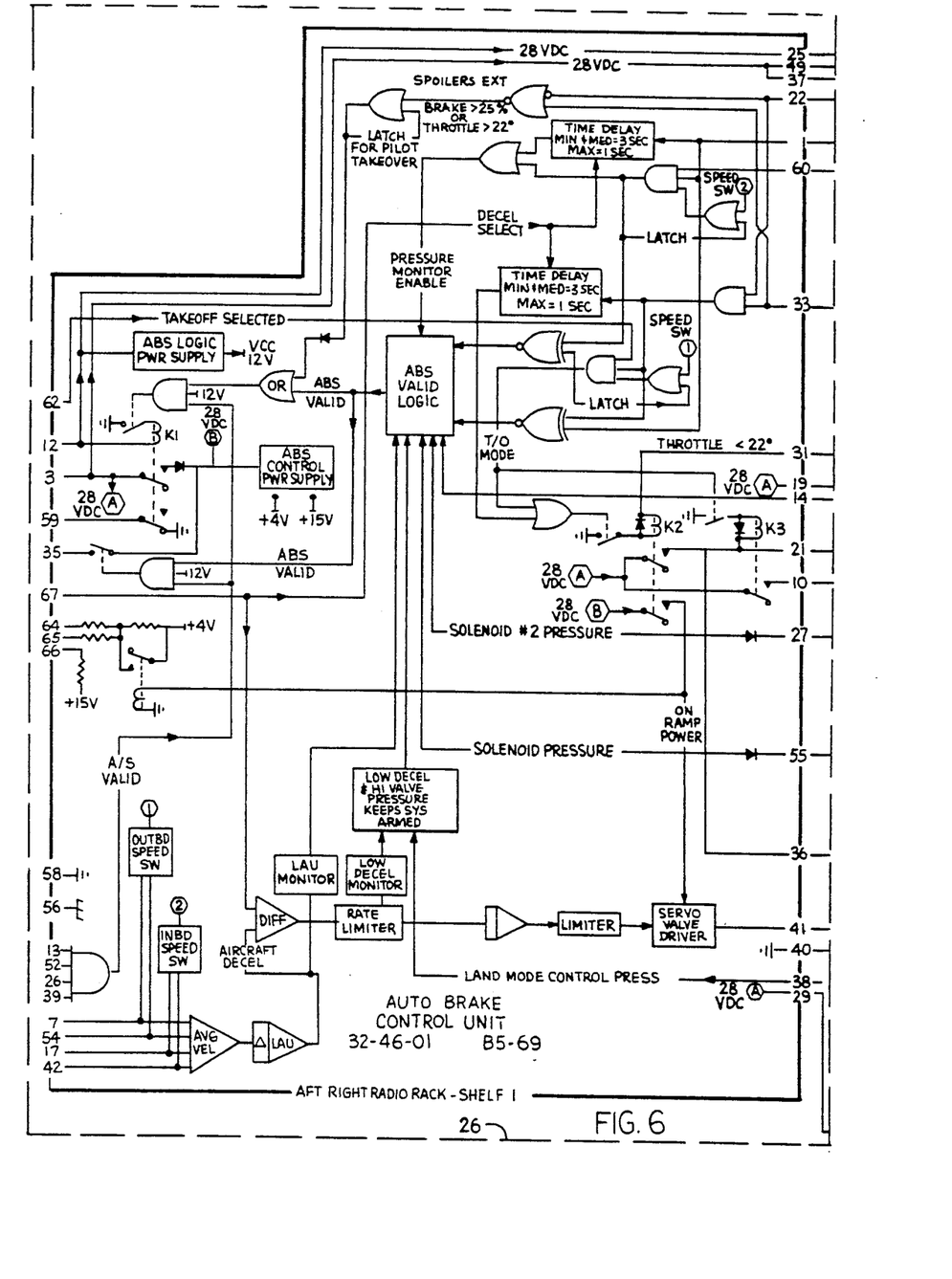
FIG. 6 is a circuit block diagram of the ABS computer control unit of FIGS. 2 and 4.
Figure 7:
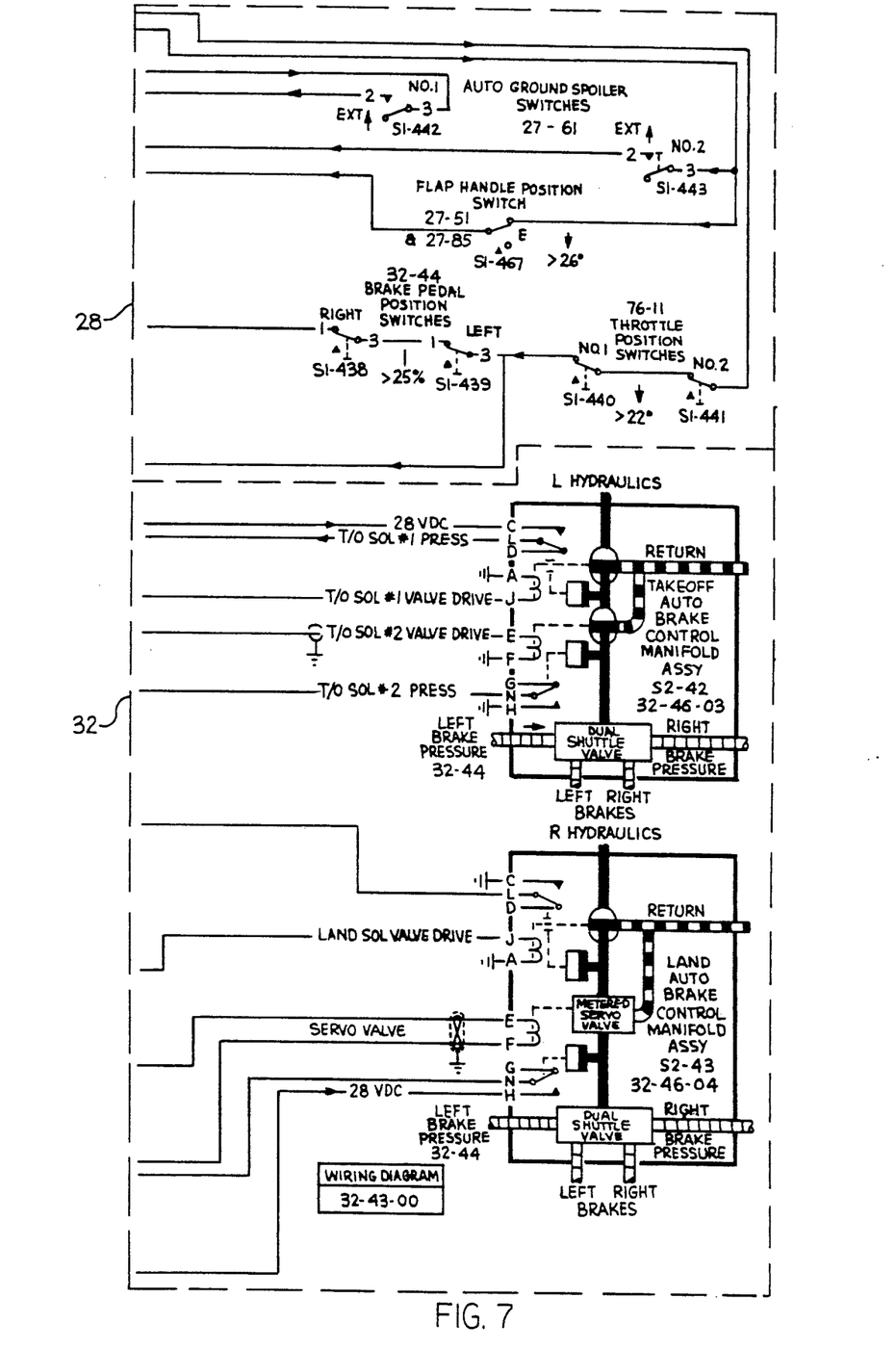
FIG. 7 is a circuit block diagram of the ABS valid control switches and ABS hydraulic system of FIGS. 2 and 3.
Figure 8:
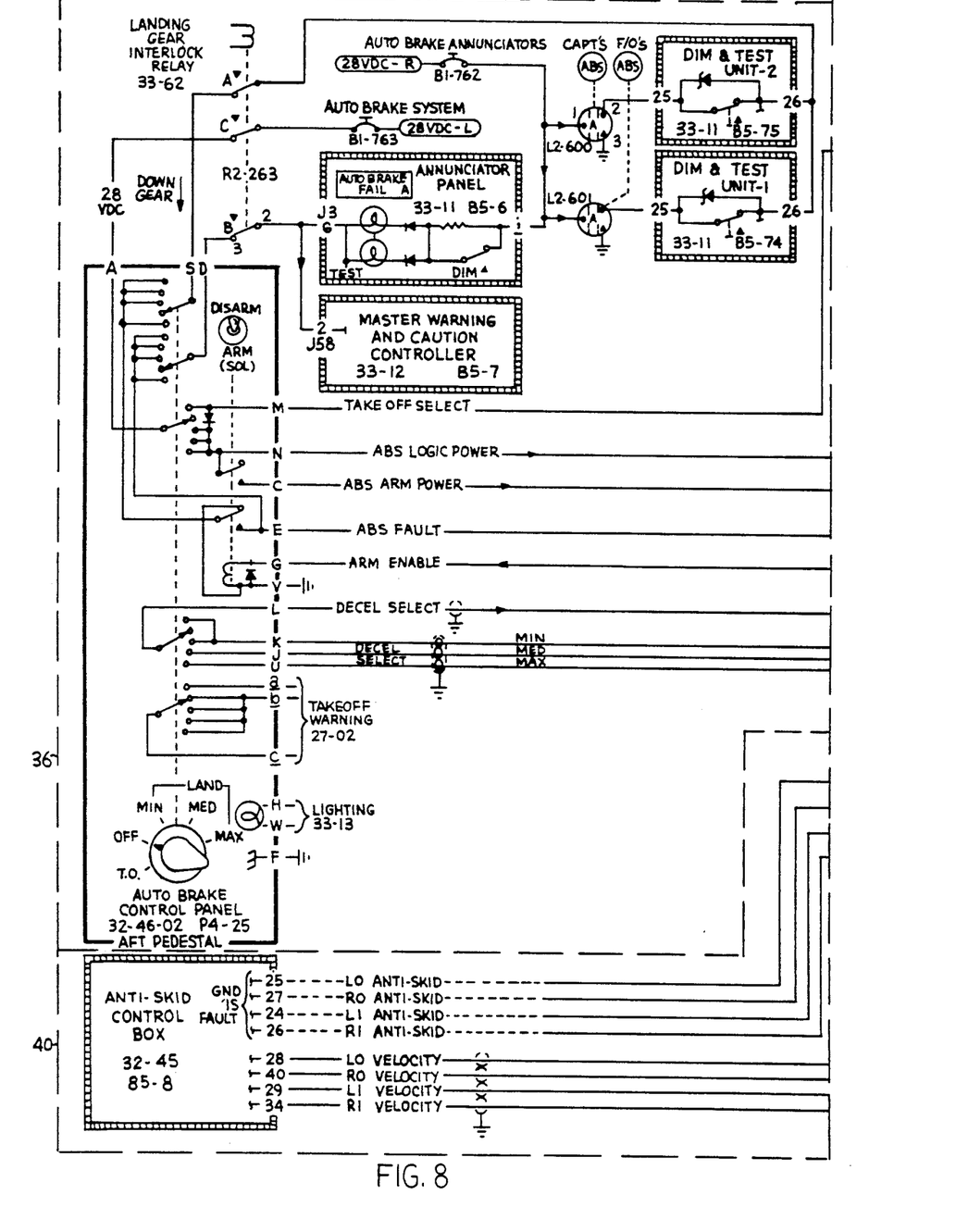
FIG. 8 is a circuit block diagram of the ABS computer control panel of FIGS. 3 and 4.

FIG. 5 shows a third operational mode of the tester 10. In the third operational mode, the tester main unit 12 is electrically connected, by means of the bleed cable harness 18, to the hydraulic system 32 for bleeding of the takeoff and land auto brake control manifolds 96 and 98. In contrast to the first and second modes, in the third operational mode the tester main unit 12 is preferably electrically connected to a source of electrical power via means for supplying electrical power 22 (FIG. 1a) and not to the electrical power input circuits of the ABS. The main unit 12 in the third operational mode utilizes the second bypass switch panel 30, the second indicator light panel and the fourth indicator light panel and these panels are electrically connected to the hydraulic system and the power means 22 identically as in the first operational mode. The tester main unit 12 essentially holds the valves of the manifolds of the ABS hydraulic system 32 open so that a hydraulic pump (not shown), or other suitable bleed device, such as a bleed hose or brake bleed cart can be used to pump hydraulic fluid through the hydraulic system 22 to thereby bleed the hydraulic lines thereof. Switch S1 allows selective connection of the circuit components of the tester main unit 12 to either the power means 22 or the electrical power input circuits of the ABS.

Accordingly, there has been provided, in accordance with the invention, an ABS tester and brake bleed tool which fully satisfies the objectives set forth above. It is to be understood that all terms used herein are descriptive rather than limiting. Although the invention has been described in conjunction with the specific embodiment set forth above, many alternatives, modifications and variations will be apparent to those skilled in the art in light of the disclosures set forth herein. Accordingly, it is intended to include all such alternatives, embodiments, modifications, and variations that fall within the scope of the invention as set forth in the claims set forth hereinbelow.

We claim:

1. An apparatus for testing automatic braking systems, comprising:
   a first bypass switch panel for electrical connection to computer control unit of the automatic braking system and to braking system valid control switches, said first switch panel electrically connected to electrical power input circuits of the automatic braking system;
   a first indicator light panel electrically connected to said first bypass switch panel for electrically tapping into electrical circuits of said first bypass switch panel, the computer control unit and the braking system valid control switches;
   a second bypass switch panel for electrical connection to electrical circuits of the computer control unit and hydraulic system, said second bypass switch panel electrically connected to the electrical power input circuits;
   a second indicator light panel electrically connected to said second bypass switch panel for electrically tapping into electrical circuits of said second bypass switch panel, the computer control system unit and the hydraulic system;
   a test switch panel for electrical connection to said brake hydraulic system, said test panel electrically connected to the power circuits;
   a third indicator light panel electrically connected to said test switch panel for electrically tapping into electrical circuits of said test switch panel, the computer unit and the hydraulic system.

2. The apparatus of claim 1 further including:
   a meter select switch for electrical connection to the computer control unit and the brake hydraulic system, said meter switch electrically connected to said second bypass switch panel;
   a voltmeter electrically connected to said meter select switch.

3. The apparatus of claim 2 further including:
   a test lead electrically connected to said voltmeter;
   a first set of test jacks electrically connected to said first bypass switch panel for selective connection of said test lead thereto in order to test electrical circuits of the valid control switches;
   a second set of test jacks electrically connected to said second bypass switch panel for selective connection of said test lead thereto in order to test electrical circuits of the hydraulic system;
   a third set of test jacks electrically connected to said second bypass panel for selective connection of said test lead thereto in order to test electrical circuits of the computer control unit;
   a fourth set of test jacks electrically connected to said test switch for selective connection of said test lead thereto in order to test electrical circuits of the computer control unit;
   a fifth set of test jacks electrically connected to said test switch for selective connection of said test lead thereto in order to test electrical circuits of the brake hydraulic system;
   a sixth set of test jacks electrically connected to said first bypass switch panel for selective connection of said test lead thereto in order to test electrical circuits of the computer control unit;

4. The apparatus of claim 1 further including:
   a voltmeter;
   a meter select switch for electrical connection to said computer control unit and the brake hydraulic system, said meter switch electrically connected to said voltmeter and to said second bypass switch panel;
   a test lead electrically connected to said voltmeter
   a first set of interfacing wires (60) for electrical interconnection of the computer control unit and the valid control switches;
   a set of test jacks (82) electrically connected to said first set of wires (60) for selective connection of said test lead thereto in order to test electrical circuits of the computer control unit and the valid control switches;
   a second set of interfacing wires (62) for electrical interconnection of the computer control unit and the brake hydraulic system;

a set of test jacks (84) electrically connected to said second set of wires (62) for selective connection of said test lead thereto in order to test electrical circuits of the computer control unit and the brake hydraulic system.

5. The apparatus of claim 1 further including:
a first set of amplifiers electrically connected to said first indicator panel to provide sufficient current to said first indicator panel for illumination thereof;
a second set of amplifiers electrically connected to said second indicator panel to provide sufficient current to said second indicator panel for illumination thereof;
a third set of amplifiers electrically connected to said third indicator panel to provide sufficient current to said third indicator panel for illumination thereof.

6. The apparatus of claim 1 further including:
an input jack electrically connected to said indicator light panels, said bypass switch panels and said test switch panel;
an adapter rack for electrically interfacing the computer control unit, the valid switches and the hydraulic system;
an adapter cable removably connected to said input jack and said adapter rack for removably connecting said bypass switch panels, said test switch panel and said indicator light panels to the computer unit, the valid switches and the hydraulic system.

7. An apparatus for testing automatic braking systems, comprising:
a first indicator light panel (50) for electrical connection to valid control switches of the automatic braking system;
a bypass switch panel (30) for electrical connection to hydraulic brake system of the automatic braking system, said bypass switch panel (30) electrically connected to electrical power input circuits of the automatic braking system;
a second indicator light panel (52) for electrical connection to the hydraulic brake system, said second indicator light panel (52) electrically connected to said second bypass switch panel;
a bypass switch panel (38) for electrical connection to the valid control switches and to the computer control panel of the braking system, said bypass switch panel (38) electrically connected to the electrical power input circuits;
a third indicator light panel (56) for electrical connection to the computer control panel, said third indicator panel (56) electrically connected to said bypass panel (38);
a test switch panel for electrical connection to the brake hydraulic system, said test switch panel electrically connected to the power input circuits;
a fourth indicator light panel (54) for electrical connection to the hydraulic system, said fourth indicator panel (54) electrically connected to said test switch panel.

8. The apparatus of claim 7 further including:
a set of amplifiers (42) electrically connected to said first indicator panel (50) to provide sufficient current to said first indicator panel (50) for illumination thereof;
a set of amplifiers (44) electrically connected to said third indicator panel (56) to provide sufficient current to said third indicator panel (56) for illumination thereof;
a set of amplifiers (46) electrically connected to said fourth indicator panel (54) to provide sufficient current to said fourth indicator panel (54) for illumination thereof.

9. The apparatus of claim 7 further including:
a voltmeter;
a meter select switch for electrical connection to the computer control panel, said meter switch electrically connected to said voltmeter.

10. The apparatus of claim 7 wherein said bypass switch panel is electrically connected to two indicators of said third indicator panel, said two indicators provided for electrical connection to an arm enable circuit of the computer control panel.

11. The apparatus of claim 7 further including:
an input jack electrically connected to said second and fourth indicator light panels (52, 54) and said bypass switch panel (30); and
a bleed harness removably connected to said input jack and to the brake hydraulic system for removably connecting said second indicator panel (52) and said bypass switch panel (30) to the brake hydraulic system for bleeding of brake manifolds.

12. The apparatus of claim 7 further including:
an input jack electrically connected to said bypass switch panels, said test switch panel and said indicator panels;
an adapter rack for electrically interfacing the computer control panel and the brake hydraulic system; and
an adapter cable removably connected to said input jack and said adapter rack for removably connecting said bypass switch panels, said test switch panel and said indicator light panels to the computer control panel, the brake hydraulic system and the valid control switches.

13. An apparatus for testing of automatic braking systems, comprising:
a indicator light panel (56) for tapping into electrical circuits of computer control panel and computer control unit of the braking system; and
a bypass switch panel (34) for electrical connection to an anti skid control unit of the automatic braking system and the computer control unit, said bypass switch panel (34) electrically connected to electrical power input circuits of the braking system;
an set of test jacks (86) electrically connected to said indicator light panel (56) for selective testing of electrical circuits of the computer control panel;
an set of test jacks (80) electrically connected to said bypass switch panel (34) for selective testing of electrical circuits of the anti skid control unit.

14. The apparatus of claim 13 further including a set of amplifiers (44) electrically connected to said indicator light panel (56) to provide sufficient electrical current to said indicator panel (56) for illumination thereof.

15. The apparatus of claim 13 further including:
a voltmeter;
a meter select switch for electrical connection to the computer control panel, said meter select switch electrically connected to said voltmeter and to said bypass switch panel.

16. The apparatus of claim 13 further including a wheelspeed adjustment control electrically connected to said bypass switch panel.

17. The apparatus of claim 13 further including:

a set of interfacing wires (64) for electrical interconnection of the computer control panel and the computer control unit; and a set of interfacing wires (69) for electrical interconnection of an anti skid control unit and the computer control unit.

18. An apparatus for testing of automatic braking systems, comprising:
   a indicator light panel (56) for electrical connection to electrical circuits of computer control panel and computer control unit of the braking system;
   a bypass switch panel (34) for electrical connection to an anti skid control unit of the automatic braking system and the computer control unit, said bypass switch panel (34) electrically connected to electrical power input circuits of the braking system;
   a voltmeter;
   a meter select switch for electrical connection to the computer control panel, the anti skid unit and the computer control unit, said meter select switch electrically connected to said voltmeter and to said bypass panel (34);
   a test lead electrically connected to said voltmeter;
   an set of test jacks (86) electrically connected to said indicator light panel (56) for selective connection of said test lead thereto in order to test electrical circuits which include the computer control panel and the computer control unit;
   a set of test jacks (80) electrically connected to said bypass switch panel (34) for selective connection of said test lead thereto in order to test electrical circuits of the anti skid control unit;
   a set of test jacks (78) electrically connected to said bypass switch panel (34) for selective connection of said test lead thereto in order to test electrical circuits of the computer control unit.

19. An apparatus for testing of automatic braking systems, comprising:
   a indicator light panel (56) for electrical connection to electrical circuits of computer control panel and computer control unit of the braking system;
   a bypass switch panel (34) for electrical connection to an anti skid control unit of the automatic braking system and the computer control unit, said bypass switch panel (34) electrically connected to electrical power input circuits of the braking system;
   a set of interfacing wires (64) for electrical interconnection of the computer control panel and the computer control unit;
   a set of interfacing wires (65) for electrical interconnection of the computer control panel and the computer control unit;
   a set of interfacing wires (69) for electrical interconnection of the anti skid control unit and the computer control unit;
   a voltmeter;
   a meter select switch for electrical connection to the computer control panel, the computer control unit and the anti skid control unit, said meter select switch electrically connected to said voltmeter, to said bypass switch panel (38) and to a selected one of said set of interfacing wires (65);
   a test lead electrically connected to said voltmeter;
   an set of test jacks (86) electrically connected to said sets of interfacing wires (64, 65) for selective connection of said test lead thereto in order to test electrical circuits of the computer control panel and the computer control unit;
   a set of test jacks (90) electrically connected to said set of interfacing wires (65) for selective connection of said test lead thereto in order to test electrical circuits of the anti skid unit and the computer control unit.

20. An apparatus for testing automatic braking systems, comprising:
   a first bypass switch panel for electrical connection to a computer control unit of the automatic braking system and to braking system valid control switches, said first switch panel connected to electrical power input circuits of the automatic braking system;
   a first indicator light panel for tapping into electrical circuits of the valid control switches;
   a second bypass switch panel for electrical connection to the brake hydraulic system;
   a second indicator light panel for electrical connection to the hydraulic system and for electrical connection to the hydraulic system and the computer control unit, said second indicator panel electrically connected to said second bypass panel;
   a third bypass switch panel for electrical connection to an anti skid control unit of the automatic braking system and to the computer control unit, said third bypass switch panel connected to the electrical power circuits;
   a fourth bypass switch panel for electrical interconnection of computer control panel of the braking system and the valid control switches, said fourth bypass panel connected to the power circuits;
   a test switch for electrical connection to said brake hydraulic system, said test switch connected to the power circuits;
   a third indicator light panel for electrical connection to the computer control panel, said third indicator panel electrically connected to said fourth bypass panel.

21. The apparatus of claim 20 wherein said first indicator light panel is electrically connected to said first bypass switch panel.

22. The apparatus of claim 20 further including:
   a set of amplifiers (42) electrically connected to said first indicator light panel (50) to provide sufficient current to said first indicator light panel (50) for illumination thereof;
   a set of amplifiers (44) electrically connected to said third indicator light panel (56) to provide sufficient current to said third indicator light panel (56) for illumination thereof.

23. The apparatus of claim 20 further including:
   a voltmeter;
   a meter select switch for electrical connection to the computer control panel, the anti skid unit and the control unit, said meter switch connected to said voltmeter, and to said fourth bypass switch panel;
   a test lead electrically connected to said voltmeter;
   a first set of test jacks electrically connected to said first bypass switch panel for selective connection of said test lead thereto in order to test electrical circuits of the valid control switches;
   a second set of test jacks electrically connected to said second bypass panel for selective connection of said test lead thereto in order to test electrical circuits of the hydraulic system;
   a third set of test jacks electrically connected to said second bypass panel for selective connection of said test lead thereto in order to test electrical circuits of the computer control unit;

a fourth set of test jacks electrically connected to said test switch panel for selective connection of said test lead thereto in order to test electrical circuits of the computer control unit;

a fifth set of test jacks electrically connected to said test switch panel for selective connection of said test lead thereto in order to test electrical circuits of the hydraulic system;

a sixth set of test jacks electrically connected to said first bypass switch panel for selective connection of said test lead thereto in order to test electrical circuits of the computer control unit.

24. The apparatus of claim 20 further including:
a voltmeter;
a meter select switch for electrical connection to the computer control unit, the computer control panel and the anti skid unit, said meter switch electrically connected to said voltmeter and to said third bypass switch panel (34);
a first set of interfacing wires (60) for electrical interconnection of the computer control unit and the valid control switches,
a set of test jacks (82) electrically connected to said first set of interfacing wires (60) for selective connection of said test lead thereto in order to test electrical circuits of the computer control unit and the valid switches;
a second set of interfacing wires (62) for electrical interconnection of the computer control unit and the hydraulic system;
a set of test jacks (84) electrically connected to said second set of interfacing wires (62) for selective connection of said test lead thereto in order to test electrical circuits of the computer control unit and the hydraulic system;
a third set of interfacing wires (64) for electrical interconnection of the computer control panel and the computer control unit;

a fourth set of interfacing wires (65) for electrical interconnection of the computer control panel and the computer control unit;
an set of test jacks (86) electrically connected to said third and fourth set of interfacing wires (64, 65) for selective connection of said test lead thereto in order to test electrical circuits of the computer control panel and the computer control unit;
a fifth set of interfacing wires (58) for electrical interconnection of the anti skid control unit and a ground;
a set of test jacks (88) electrically connected to said fifth set of interfacing wires (58) for selective connection of said test lead thereto in order to test electrical circuits of the computer control unit;
a set of test jacks (78) electrically connected to said third bypass switch panel (34) for selective connection of said test lead thereto in order to test electrical circuits of the computer control unit;
an set of test jacks (80) electrically connected to said third bypass switch panel (34) for selective connection of said test lead thereto in order to test electrical circuits of the anti skid unit.

25. The apparatus of claim 20 further including:
means for supplying electrical power connected to said second bypass switch;
an input jack electrically connected to said bypass switch panels, said test switch panel and said indicator light panels;
an adapter rack for electrically interfacing the computer control unit the computer control panel and the brake hydraulic system;
an adapter cable removably connected to said input jack and said adapter rack for removably connecting said bypass switch panels, said test switch and said indicator light to the computer control panel, the brake hydraulic system and the valid control switches;
a bleed harness removably connected to said input jack and to the brake hydraulic system for removably connecting said second indicator light panel and said second bypass switch panel to the brake hydraulic system for bleeding of brake manifolds.

* * * * *